Figure 1:
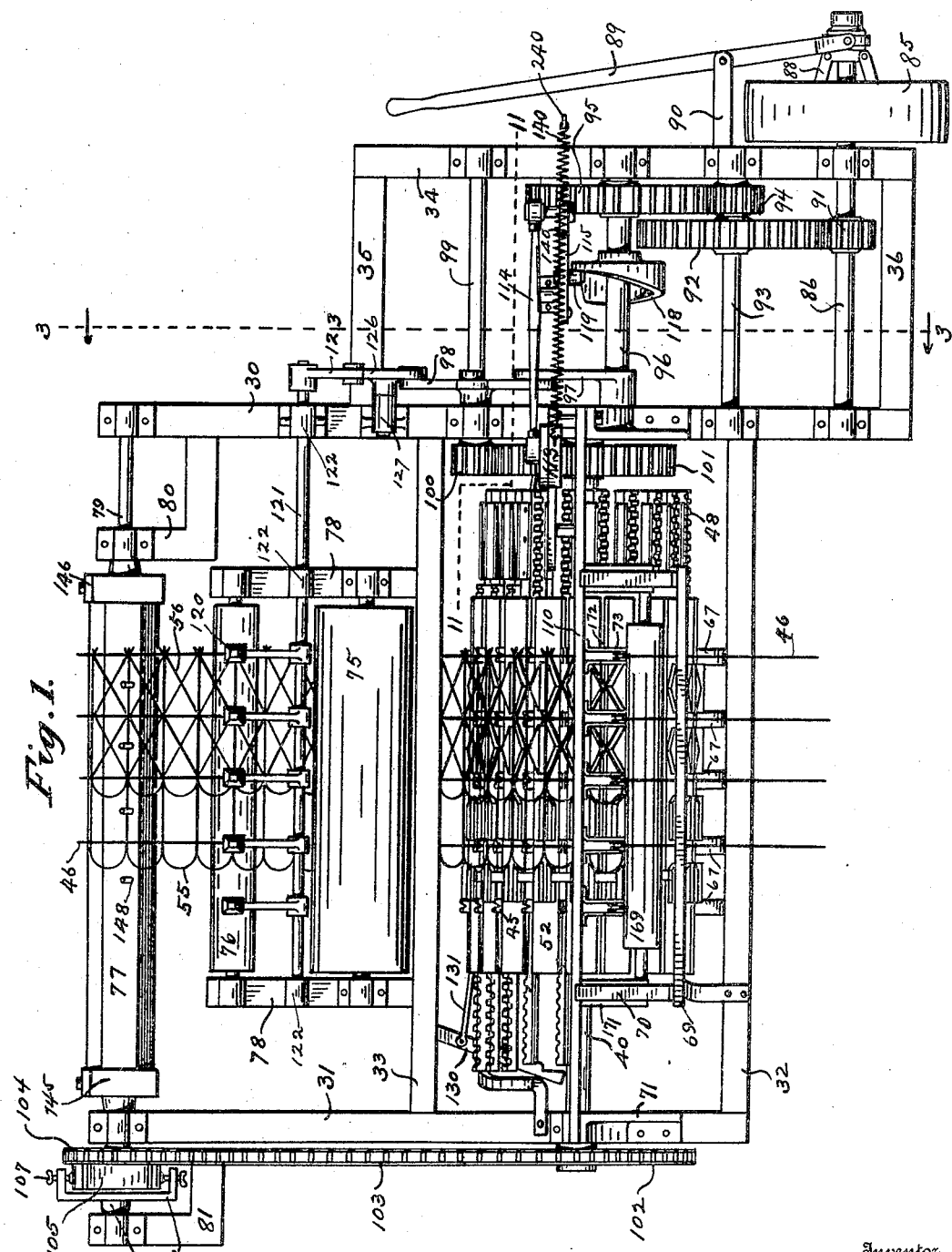

No. 793,427. PATENTED JUNE 27, 1905.
J. W. DWIGGINS.
WIRE FENCE MACHINE.
APPLICATION FILED APR. 29, 1904.

8 SHEETS—SHEET 1.

Witnesses
R. P. King
G. Folk

Inventor
John W. Dwiggins
By V. H. Lockwood
His Attorney

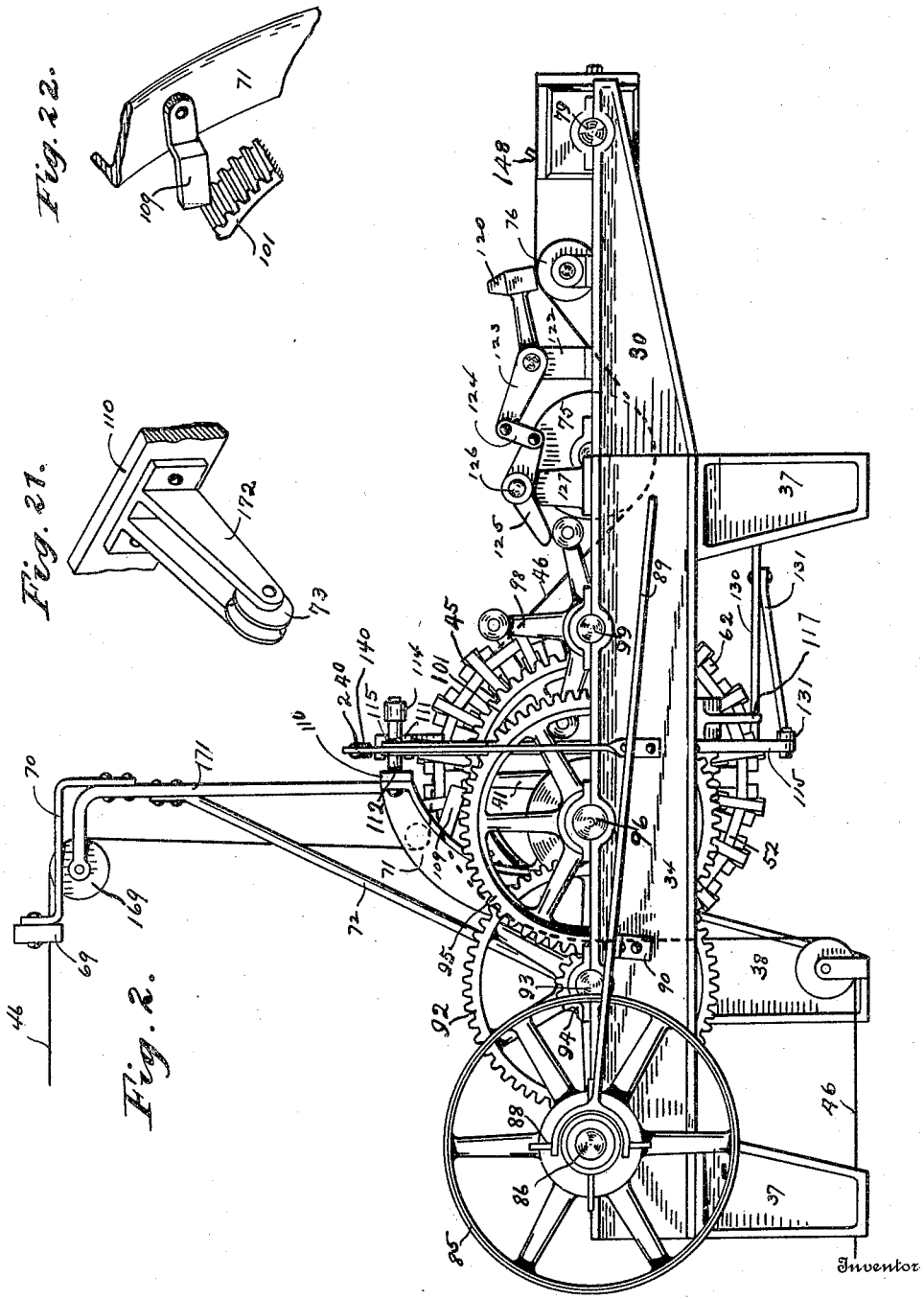

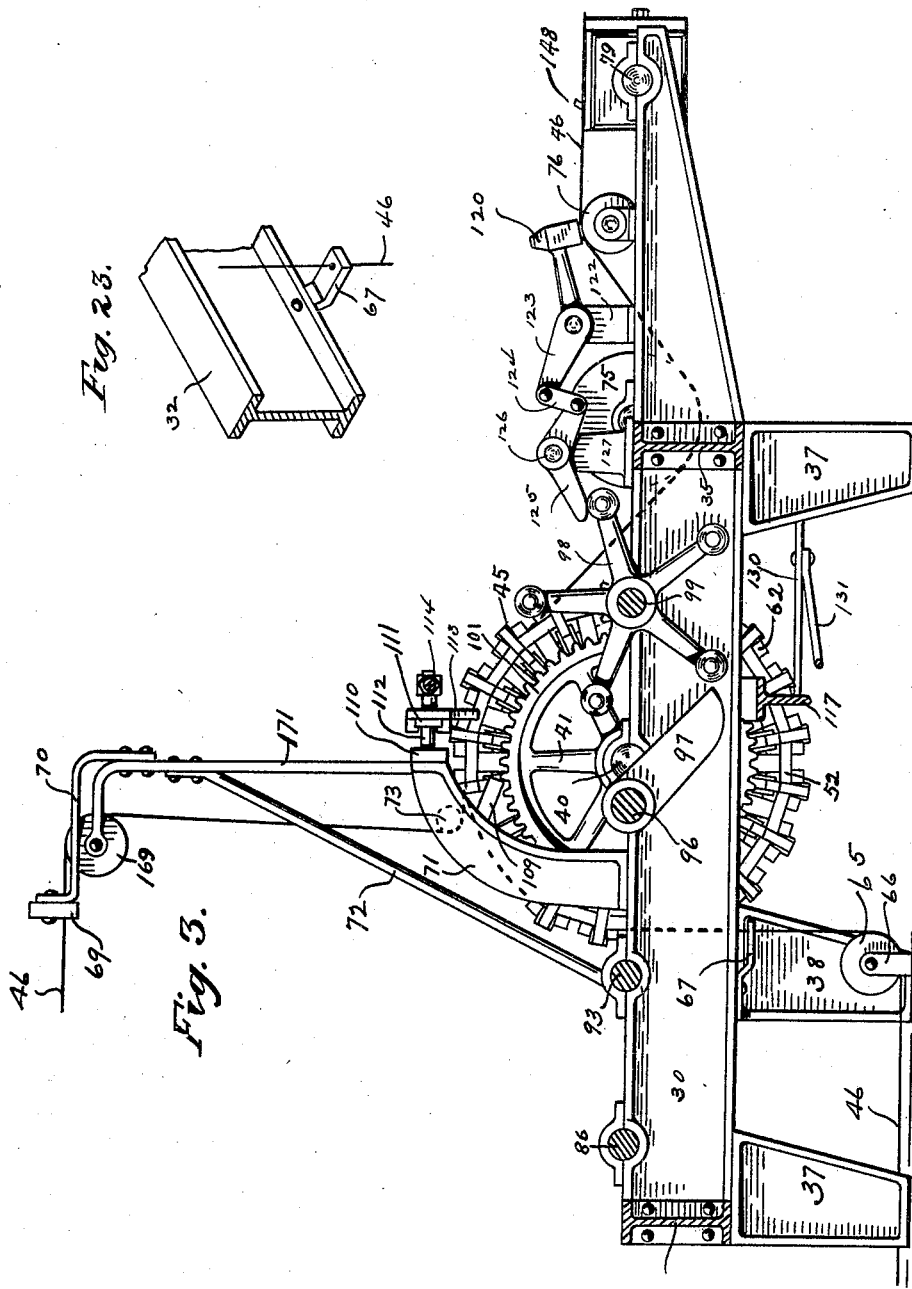

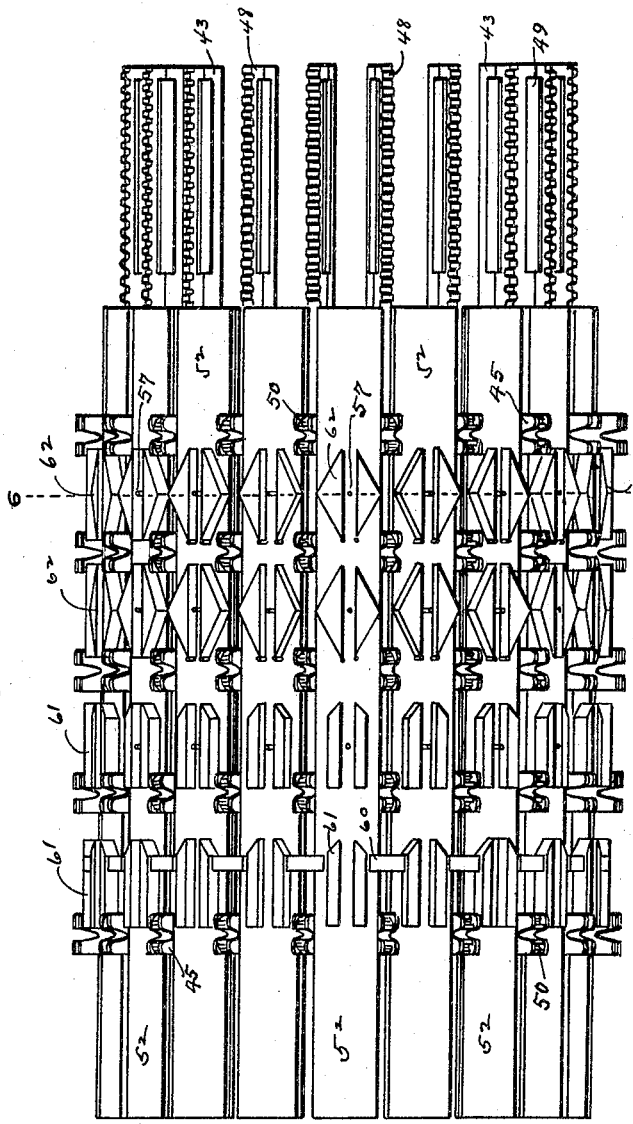

No. 793,427. PATENTED JUNE 27, 1905.
J. W. DWIGGINS.
WIRE FENCE MACHINE.
APPLICATION FILED APR. 29, 1904.
8 SHEETS—SHEET 5.
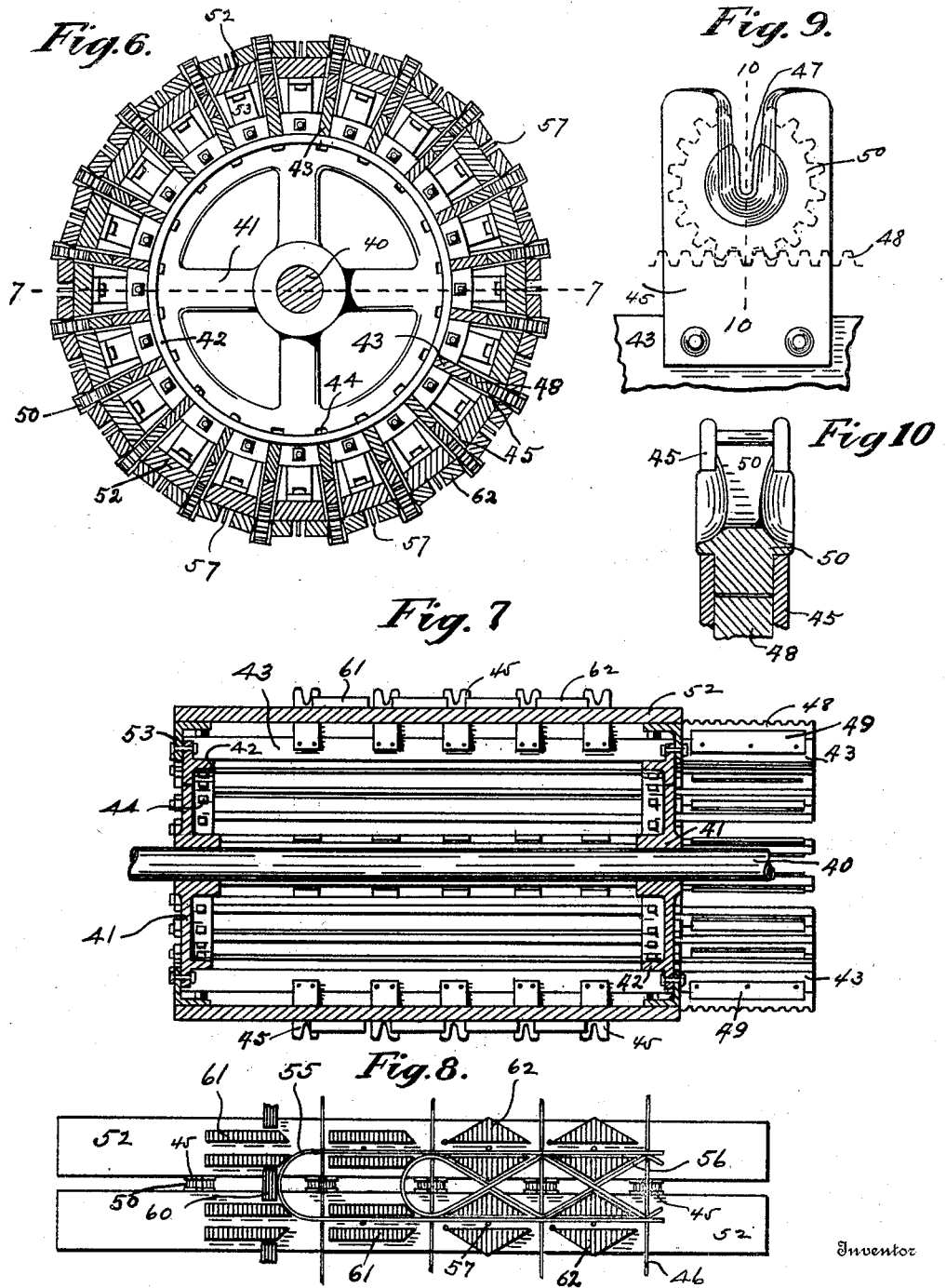

No. 793,427. PATENTED JUNE 27, 1905.
J. W. DWIGGINS.
WIRE FENCE MACHINE.
APPLICATION FILED APR. 29, 1904.

8 SHEETS—SHEET 6.

Witnesses
P. P. King
G. Foltz

Inventor
John W. Dwiggins,
By V. H. Lockwood.
His Attorney

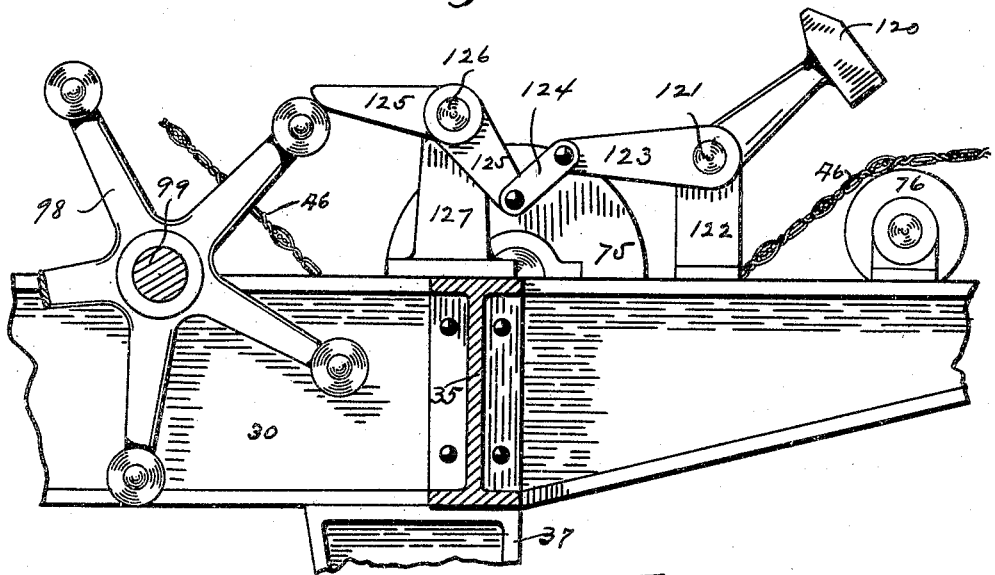
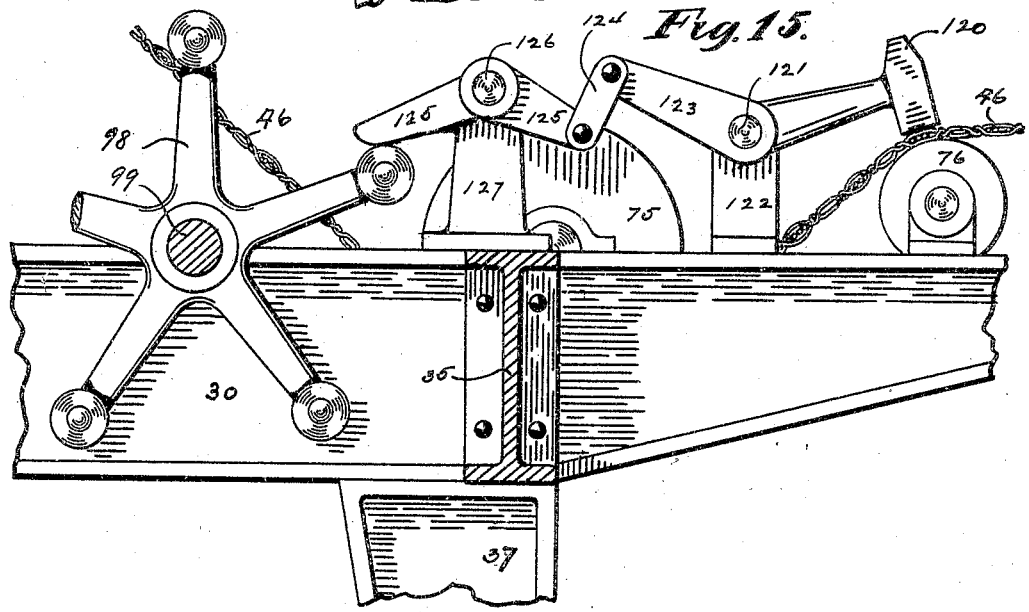

No. 793,427. PATENTED JUNE 27, 1905.
J. W. DWIGGINS.
WIRE FENCE MACHINE.
APPLICATION FILED APR. 29, 1904.
8 SHEETS—SHEET 8.
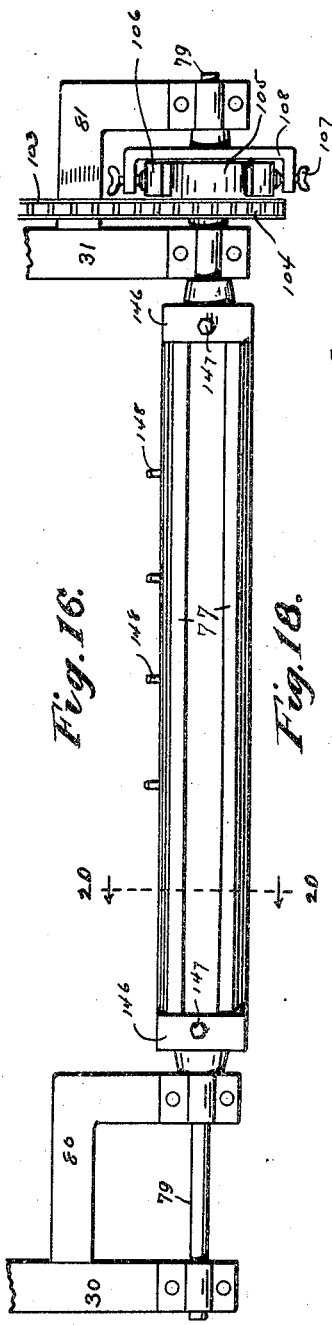
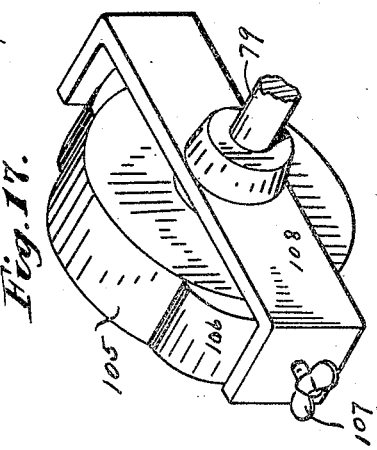
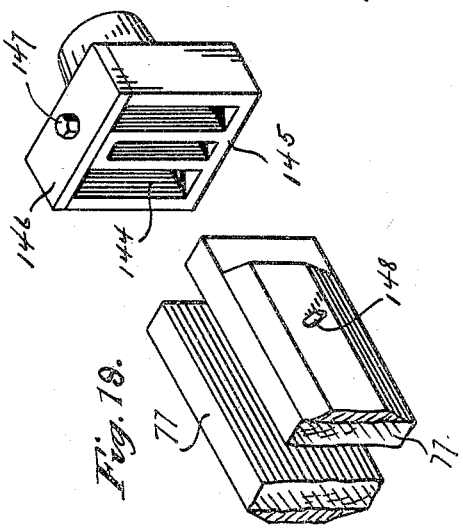
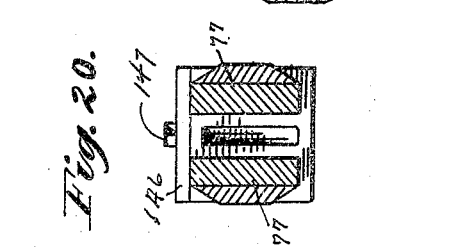
Witnesses
P. P. King
G. Foltz
Inventor
John W. Dwiggins,
By V. H. Lockwood.
His Attorney No. 793,427. Patented June 27, 1905.

UNITED STATES PATENT OFFICE.

JOHN W. DWIGGINS, OF LAFAYETTE, INDIANA, ASSIGNOR TO THE LAFAYETTE FENCE AND MACHINE COMPANY, OF LAFAYETTE, INDIANA, A CORPORATION OF INDIANA.

WIRE-FENCE MACHINE.

SPECIFICATION forming part of Letters Patent No. 793,427, dated June 27, 1905.

Application filed April 29, 1904. Serial No. 205,511.

*To all whom it may concern:*

Be it known that I, JOHN W. DWIGGINS, of Lafayette, county of Tippecanoe, and State of Indiana, have invented a certain new and useful Wire-Fence Machine; and I do hereby declare that the following is a full, clear, and exact description thereof, reference being had to the accompanying drawings, in which like numerals refer to like parts.

The object of this invention is to provide a power-driven machine for manufacturing lawn-fence, such as is shown in United States Letters Patent granted to me, No. 474,952, for wire fence, dated May 17, 1892, Design No. 22,358, for fence-panel, dated April 18, 1893, and Design No. 22,359, April 18, 1893. This fence has U-shaped palings woven in with running-wires, the latter being twisted between the legs of each paling.

One feature of this invention consists in an intermittently-rotated drum for forming the fence fabric over which the running-wires pass and upon the surface of which the palings are placed previous to their being interwoven with the running-wires. Said drum has at intervals rows of twisters and a rack-bar for driving each row of twisters. With this drum arrangement the operation of the machine is continuous and automatic. The operator does nothing but place the palings in upon one set of the running-wires and the machine does the rest. By it said fence fabric can be manufactured very rapidly with the services of one man.

Another feature of the invention consists in means for pressing or hammering the union between the running-wires and the palings, so that the palings will be held very firmly by the running-wires and the fence will be symmetrical and perfect.

These and the other features of my invention will be understood from the accompanying drawings and the following description and claims.

Figure 11:
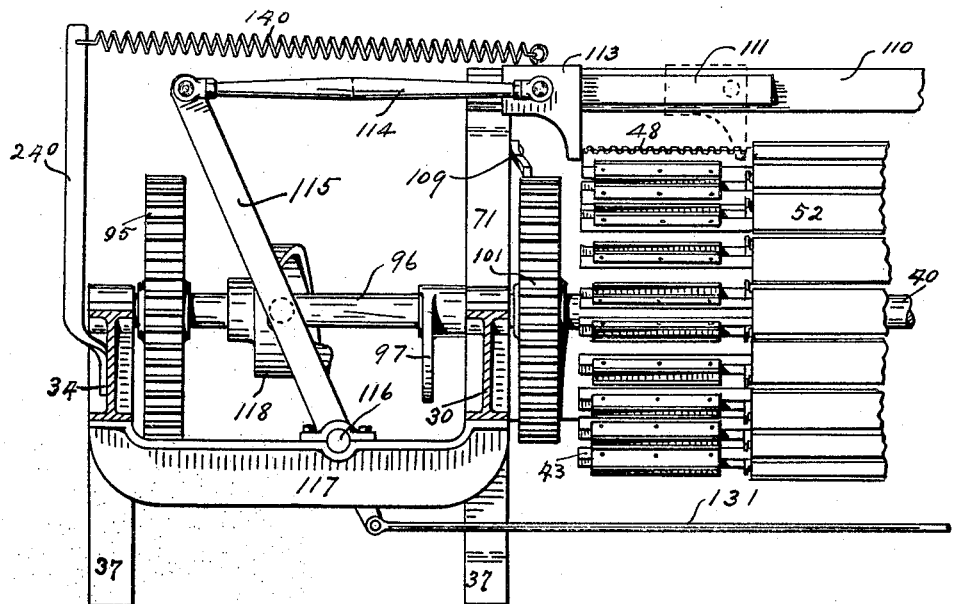
Figure 12:
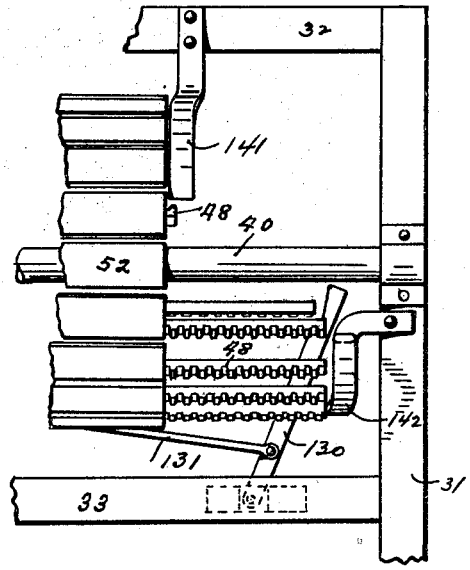
Figure 13:
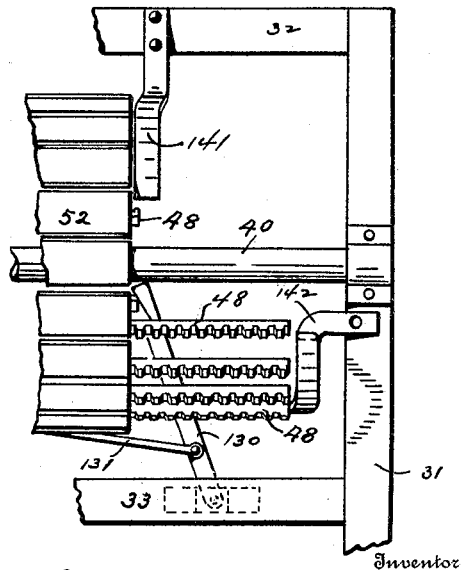

In the drawings, Figure 1 is a plan view of the machine, the nearer side being the front of the machine. Fig. 2 is an elevation of the right-hand side of the machine. Fig. 3 is a vertical longitudinal section on the line 3 3 of Fig. 1, parts shown in elevation the same as in Fig. 2. Fig. 4 is a plan view of the fence-forming drum, it being on a larger scale than is shown in Fig. 1. Fig. 5 is an elevation of a set of twisters and means for driving the same, parts being shown in section. Fig. 6 is a transverse section on the line 6 6 of Fig. 4 of the fence-forming drum. Fig. 7 is a central longitudinal section of the fence-forming drum on the line 7 7 of Fig. 6. Fig. 8 is a plan view of one portion or section of the drum, showing the manner of placing the palings during the operation of the machine. Fig. 9 is a side elevation of one of the twister-holders and a part of its mounting, the twister and rack-bar being shown in dotted lines and parts broken away. Fig. 10 is a section on the line 10 10 of Fig. 9. Fig. 11 is a vertical section on the line 11 11 of Fig. 1, parts in rear elevation and parts being broken away. Fig. 12 is a plan view of a part of the left lower corner of what is shown in Fig. 1, viewing it from the rear and producing it on a large scale, parts being broken away and said figure showing the rack-returning lever in one extreme position. Fig. 13 is the same as Fig. 12, showing the rack-returning lever in the other extreme position, it having forced inward a rack. Fig. 14 shows a portion of Fig. 3 on an enlarged scale, parts being broken away and the hammer in its upper position. Fig. 15 is the same with the hammer in its lower position. Fig. 16 is a plan view of the reel mechanism viewed from the rear of the machine and with parts broken away. Fig. 17 is a perspective view, on a large scale, of the clutch-drive for the reel shown in Fig. 16. Fig. 18 is a perspective view of one of the reel-holding brackets. Fig. 19 is a perspective view of a pair of the reel-forming bars, the same being partly broken away. Fig. 20 is a section on the line 20 20 of Fig. 16. Fig. 21 is a perspective view of one of the sheave-pulleys for guiding the upper strand-wires and the means for supporting the same, parts being broken away. Fig. 22 is a perspective view of the means for preventing back movement of the fence-forming drum, parts being broken away. Fig. 23 is a perspective view of the means for guiding the lower running-wires and means for mounting the same, parts being broken away.

The details of construction of the machine herein shown and the mode of operation of the parts are as follows:

A horizontal main frame is formed, consisting of a right-hand side beam 30, a left-hand side beam 31, a front transverse beam 32, and an intermediate transverse beam 33, and a supplementary frame consisting of a right-hand beam 34 and transverse beams 35 and 36, which extend to the beam 30. These two frames are united and supported on suitable legs 37 and 38. This frame forms practically three sections—one, the central front section for the fence-weaving mechanism, a rear section for the fence finishing and reeling mechanism, and a right-hand section for the driving mechanism—all of which appears plainly in Fig. 1.

The fabric is woven and made on a drum secured upon the shaft 40, that is mounted in suitable bearings upon the beams 30 and 31 of the main frame. The construction of this drum is shown best in Figs. 6 and 7. A wheel 41 is secured to the shaft 40 near each end and has a horizontal flange 42 extending inward, as seen in Fig. 7. Upon this cross-bars 43 are secured by bolts 44 at intervals, as appears in Fig. 6. Each of said stationary bars 43 carries a series of twister-brackets 45, as shown in Fig. 9, the number of said brackets on each bar agreeing with the number of running-wires 46 that may be desired in the fence fabric. These twister-brackets are arranged in annular series on the drum, so that each series will receive the same running-wires or strands. Said brackets consist of a pair of plates placed one on each side of the bar 43 and in their outer ends have a slot 47 wide enough to permit the running-wires of the fence fabric to enter. On each bar 43 a twister-actuating rack-bar 48 is loosely placed between the two rows of bracket-plates 45 and also the plates 49, secured to each bar 43. Between each pair of bracket-plates 45 a twister 50 is mounted, as shown in Figs. 9 and 10. It has laterally-extending hubs rotatably mounted in corresponding bearings in the plates 45 and is slotted to the center to correspond with the slot 47 in the bracket-plates 45 and is toothed in order to mesh with the rack 48 and be actuated thereby. The longitudinal movement of each rack-bar 48 operates all the twisters in one row along the drum. Between each pair of twister constructions, such as I have described as being mounted on the drum, a plate 52 is secured, extending longitudinally of the drum and held in place by arms 53, bolted at their inner ends to the wheels 41 and at their outer ends bolted to said plates 52, as seen in Fig. 6. This construction so far described makes a strong drum with a number of twisters arranged circumferentially around the drum and held sufficiently far apart by the plates 52 to provide a place and means for mounting the palings 55.

As seen in Fig. 8, the palings woven into the running-wires 46 consist of one or more wires formed into a single strand and bent midway between its ends U-shaped. As shown in that figure, there is one plain U-shaped paling 55 and another paling 56 smaller and within the paling 55, and it is made by crossing the wires forming it. As shown in Fig. 8, there is placed midway of each board or plate 52, and therefore midway between each row of twisters across the drum, a row of pins 57. The palings 55 are placed within or between two rows of these pins. These palings are put in place by hand as the drum revolves slowly, and the pins 57 both aline the legs of the palings and keep them from spreading, as well as separate the adjacent palings. Thus it is seen that one leg of each paling lies on one side of the row of twisters across the drum, and the other leg of the paling lies on the other side thereof, so that the twisters can twist the strands 46 between the legs of the palings.

In order to hold the palings in more exact position, I provide stops 60 to aline the curved ends of the palings, which make the upper part of the fence, and also the longitudinal form-blocks 61 and the triangular form-blocks 62, which coöperate with the pins 57 in holding the outside paling 55 in place, and also the inside cross-paling in proper position and form. The triangular-shaped blocks 62 fit in the triangles between the inner palings 56 and the outer palings 55. The result of this arrangement of stops and blocks is that the palings can be placed in exact positions and be held absolutely in place during the formation of the fence, thus making an absolutely uniform and symmetrical fence fabric.

The fence fabric which this machine is designed to make has longitudinal strands, each consisting of two of the running-wires 46. One set of these running-wires 46 comes into the machine near the floor and passes about the roller 65, mounted on a bracket 66, that is secured to the legs of the machine. This lower set of wires 46 passes upward through guiding-fingers 67, secured to the under side of a cross-beam 32, and over the circumferential rows of twisters mounted on the drum. The other set of running-wires 46 comes from above and passes through holes in the guide-bar 69, that extends across the machine and above the main portion thereof that at each end is mounted on an arm 70, secured to upright bars 171 on posts 71, one of which is mounted on the beam 30 and the other on the beam 31 and are braced by braces 72. From said guide-bar 69 the upper wires 46 pass over the roller 169 downward under sheave-wheels 73, mounted on the brackets 172, extending from cross-bar 110, so as to be close to the drum and in front of the top thereof, whereby said wires will be held by the wheels 73 down into the twisters the same as the lower wires 46. Thence each pair of running-wires passes over the drum and under a large roll 75 to the rear thereof, and then over a small roll 76 to the rear of the roll 75, and thence to the reel 77. The two rolls 75 and 76 are carried by spindles running in suitable bearings on bars 78, extending rearward from the beam 33. The reel 77 is carried by the spindles 79, mounted in suitable bearings on the rear ends of the beams 30 and 31. They are also on the arms 80 and 81, secured to said beams, respectively.

In operation the running-wires are first put in place, as indicated above, and secured to the reel, so that as the reel revolves it will draw said wires through the machine, and thus feed the fabric through the machine, and as said running-wires are thus drawn through the machine the palings are woven with them. The operator stands in front of the machine and big drum and places the palings 55 and 56, as shown in Fig. 8, on the upper left-hand part of the drum, as appears in Fig. 6. These palings are placed upon the lower running-wires 46, as seen in Fig. 8. Subsequent rotation of the drum brings the palings thus placed under the upper running-wires 46, so that the palings will have a running-wire above and a running-wire below the same at intervals throughout the length of the palings, and subsequently, as will hereinafter appear, said running-wires are twisted between the legs of the palings by the longitudinal movement of the rack-bar 48, that rotates the twisters about two times. The subsequent rotation of the drum and rearward movement of the fabric thus made causes the fabric to pull away from the drum and disengage itself from the twisters, as indicated in Figs. 2 and 3.

The parts are actuated by the following mechanism: Power is supplied through the pulley 85 on the shaft 86, said pulley being thrown into and out of engagement with the shaft by the clutch mechanism 88 and the lever 89, pivoted to the arm 90. A pinion 91 on the shaft 86 engages the gear 92 on the shaft 93 and drives the pinion 94 on the shaft 93, which in turn actuates the gear 95 on the shaft 96 and causes the arm 97, that is secured to said shaft 96, to revolve and engage one of the cranks 98 on the shaft 99, which cranks form a star-wheel. There are five of these cranks 98 arranged radially on the shaft 99 equidistant from each other, so that each revolution of the shaft 96 and arm 97 causes one-fifth of a revolution of the cranks 98 and the shaft 99. In this way intermittent movement is transmitted from the shaft 96 to the shaft 99. The shaft 99 carries a pinion 100, that meshes with the gear-wheel 101 on the drum-shaft 40, and thus intermittently drives said drum-shaft and the fence-forming drum. The gear connection between the shaft 99 and the drum-shaft 40 is geared down, so that a one-fifth revolution of the shaft 99 will cause only a one-twentieth revolution of the drum-shaft and drum. Thus at each intermittent movement of the drum and transverse set of twisters and wire-holding blocks, such as shown in Fig. 8, is a section of the drum brought into position for the operator in placing the palings, as has been described. The shaft 40 through a sprocket-wheel 102 on the other end of said shaft and the sprocket-chain 103 drives a sprocket-wheel 104, that is loosely mounted on a spindle 79 of the reel. Said sprocket-wheel 104 is secured to a friction-wheel 105, which is in frictional engagement with friction-blocks 106, that are by the set-screws 107 secured to the bracket 108, that in turn is secured to the spindle 79 of the reel. This causes the forward rotation of the reel, excepting when it is held from rotation by the tautness of the fence fabric which is being wound thereon, and when so held temporarily the friction-wheel 105 turns without rotating the reel. The fence-forming drum is held from rearward rotation by a gravity-pawl 109, that is mounted on the stand 71. A cross-bar 110 extends from the stand 71 on one side to the stand on the other side, and it carries behind it a horizontal parallel guiding-bar 111 by means of the two bolts or rods 112. On this guiding-bar 111 a rack-bar pusher or head 113 is slidably mounted. Its lower end engages the end of a rack-bar 48, and when it is pushed from the full-line position to the dotted-line position (shown in Fig. 11) it actuates such rack-bar and causes the twisting of the running-wires in the fence fabric, as heretofore stated. The sliding head 113 is actuated by a connecting-rod 114, pivoted to the upper end of the lever 115, fulcrumed near its lower end on the pin 116, that has bearings in a beam 117, as seen in Fig. 11. Said lever is actuated by a cam 118, that is secured on the shaft 96, which engages a pin 119 on the lever 115. Said cam pushes the lever to the right, as shown in Fig. 11, or to the left when one is viewing it from the front of the machine, and causes the actuation of one of the rack-bars. The foregoing mechanism moves the rack-bars 48 successively in one direction for the actuation of the twisters. The following means returns each rack-bar after the rack-bar has revolved, so as to be on the under side of the drum: The lever 130 is pivoted to the under side of the cross-bar 33 and is actuated by a connecting-rod 131, pivotally connected with it at one end and at the other end to the lower end of the lever 115, as seen in Fig. 11. As seen in the last figure, the movement of the lever 115, that actuates the rack-bar on the upper side of the drum, at the same time withdraws the connecting-rod 131 to return a rack-bar on the under side of the drum. Attention here may be called to the relative location of the cam 118 and the arm 97 on the shaft 96, as seen in Fig. 11. Since said arm 97 actuates the fence-forming drum and revolves the rack-bars from one position of rest to the next, the end of the cam is placed opposite one edge of the crank 97, so that the pin 119 moves from the end of the cam to the beginning, while the crank 97 is actuating one of the cranks 98, and therefore the drum. Immediately after the drum stops such movement the cam 118 begins to move the lever 115, and it ceases moving said lever as soon as the crank 97 is ready to give another movement to the drum. Hence the offset in the cam is opposite one edge of said arm 97. The lever 115 is returned to its unoperated position by a spring 140, which at one end is connected with the sliding head 113 and at the other end with a bar 240, extending from the beam 34. The force applied by this spring causes also the return movement of the lever 130 at the other side of the machine from the position shown in Fig. 13 to the position shown in Fig. 12 ready for another rack-bar. The rack-bars are alined by a guide 141, (seen in Fig. 12,) which is secured to the front beam 32 and is curved downward parallel with the series of rack-bars. This guide-bar 141 moves the rack-bars in position, so that they will hold the twisters with the slots in the twisters registering with the slot 47 in the twister-brackets 45 and can receive the running-wires. The guide-bar 142, secured to the post 109, is curved downward to furnish a stop to limit the actuating movement of the rack-bars, and at the time the fabric is ready to leave the twisters and give the rack-bars a very slight return movement, so as again to bring the slots in the twisters in alinement with the slots in the twister-brackets and permit the escape of the fabric. To do this, said bar 142 must be curved substantially as shown in Figs. 12 and 13. From this it will be seen that at each movement of the fence-forming drum one rack-bar 48 is moved into position by the sliding head 113, and then the cam 118, through said head, moves the rack-bar and one row of twisters. This rack-bar-actuating mechanism is in the upper part of the machine, so that it actuates each rack-bar soon after it has passed the upper position and causes the twisting of the running-wires of the fence upon the palings.

The foregoing-described mechanism manufactures lawn-fence fabric of ordinary character. It is seen that the machine operates continuously and that a set of palings is placed in the fabric at each movement of the fence-forming drum, so that twenty sets of palings will be placed in one entire revolution of the drum. This causes the movement of the drum to be relatively slow, so as to give ample time for the operator to place the palings without stopping the operation of the machine. Therefore the machine turns out relatively a large amount of fabric as the work of a single operator, and the only thing he has to do is to lay the palings in place. The machine does everything else.

In order to make the fabric turned out by this machine superior, with the joints compact and close, means are provided for compressing the running-wires tightly upon the palings. In this machine said object is accomplished by a set of hammers 120, one for each longitudinal strand in the fabric. These hammers appear in Figs. 1, 2, and 14. Between the two rolls 75 and 76 there is mounted a shaft 121 in stands 122, secured on the short bars or beams 78 and the beam 30. Said hammers 120 are mounted on said shaft 121, so that the hammers will engage the fabric while it is passing over the rolls 76 and pound the strand-wires tightly on the paling-wires, as shown in Fig. 15. The hammers are actuated by gravity, but are elevated away from the fence fabric and the roll 76 by the crank 123 on the shaft 121, the end of which crank is connected by a bar 124 with one end of a double crank 125 on a spindle 126 in the stand 127. The connecting-bar 124 is pivoted to the ends of the cranks 123 and 125. One end of the double crank 125 extends in the path of the cranks 98 of the star-wheel on the shaft 99 and is actuated by said cranks 98 intermittently. Since the fence-forming drum is also actuated through the cranks 98 and said drum and the hammers are thus actuated by the same means, the action of the hammers is timed so that as the adjacent legs of two sets of palings in the fabric pass over the roll 76 the hammers will be released by the crank 98, passing and disengaging the crank 125. Hence at every intermittent movement of the shaft 99 a new paling may be placed on the fence-forming drum and the running-wires of the fabric pounded together tightly around the adjacent legs of a pair of palings.

The reel is constructed as shown in Figs. 16 to 20. It consists of two parallel bars 77, the ends of which slip into openings 144 in a bracket 145, that is secured to the spindle at each end of the reel. There are two recesses or sockets 144 to receive said bars 77, and they are held in said sockets by a removable plate 146. Both ends are similarly formed, so that when the reel is filled the nuts 147 are removed, and likewise the plate 146, and when the bracket, as shown in Fig. 18, is turned bottom side up the reel with the fabric on it will fall down and can be removed. Subsequently two other bars 77 are put in the brackets 145 and the plates 146 again secured in place. The bars 77 of the reel have pins 148, over which the fabric may be caught to hold it while being wound upon the reel.

What I claim as my invention, and desire to secure by Letters Patent, is—

1. In a wire-fence machine, a fence-forming drum, means for holding the running-wires of the fence fabric circumferentially on said drum, and twisters mounted on said drum for uniting the running-wires with palings extending longitudinally of the drum.

2. In a wire-fence machine, an intermittently-revoluble drum, means for holding the running-wires of the fence fabric circumferentially on said drum, and twisters mounted on said drum for uniting the running-wires with the palings extending longitudinally of the drum.

3. In a wire-fence machine, a revoluble drum, means for drawing the running-wires of the fence fabric circumferentially over and from said drum, and twisters mounted on said drum in position to engage said running-wires and unite them with the palings extending longitudinally of the drum.

4. In a wire-fence machine, a revoluble drum, a reel for drawing the running-wires of the fabric over and away from said drum, a single means for driving said drum and reel, and twisters mounted on said drum in position to engage said running-wires and unite them with the palings.

5. In a wire-fence machine, a revoluble drum over which the running-wires of the fence fabric pass, twisters on the drum for uniting the running-wires with the palings, and means for intermittently giving said drum a partial revolution so that the palings may be placed in position between the movements of the drum.

6. In a wire-fence machine, a revoluble drum over which the running-wires of the fence fabric pass, twisters on the drum for uniting the running-wires with the palings, and means on the drum for holding and alining the palings.

7. In a wire-fence machine, a revoluble drum over which the running-wires of the fence fabric pass, twisters on the drum for uniting the running-wires with the palings, means on the drum for holding and alining the palings, and means for intermittently giving said drum partial rotary movement.

8. In a wire-fence machine, a revoluble drum, twisters mounted on the surface of the drum and in rows around the drum and also longitudinally of the drum, and means for actuating the longitudinal rows of twisters one at a time in succession.

9. In a wire-fence machine, a revoluble drum, twisters mounted on the surface of the drum and in rows around the drum and also longitudinally of the drum, means for actuating one longitudinal row of twisters at a time, and means between each pair of longitudinal rows of twisters for alining the palings.

10. In a wire-fence machine, a revoluble drum, twisters mounted on the surface of the drum and in rows around the drum and also longitudinally of the drum, means for actuating one longitudinal row of twisters at a time, and a row of pins on the drum midway between each pair of longitudinal rows of twisters.

11. In a wire-fence machine, a revoluble drum, twisters mounted on the surface of the drum and in rows around the drum and also longitudinally of the drum, means for actuating one longitudinal row of twisters at a time, two rows of blocks between each pair of longitudinal rows of twisters, said rows of blocks being separated on a line midway between each pair of longitudinal rows of twisters.

12. In a wire-fence machine, a revoluble drum, twisters mounted on the surface of the drum and in rows around the drum and also longitudinally of the drum, means for actuating one longitudinal row of twisters at a time, and blocks on said drum between the longitudinal rows of twisters with inclined edges that engage the inclined sides of the palings when placed on the drum and hold them in proper position.

13. In a wire-fence machine, a revoluble drum, twisters mounted on the surface of the drum and in rows around the drum and also longitudinally of the drum, means for actuating one longitudinal row of twisters at a time, and a row of stop-blocks on the drum extending around it for alining the ends of the palings.

14. In a wire-fence machine, a fence-forming drum having a number of radially-extending twister mechanisms arranged at equal intervals about the drum, longitudinally-extending plates between each pair of twister mechanisms, and means on each of said plates for holding the palings in place.

15. In a wire-fence machine, a revoluble shaft, two oppositely-placed disks secured thereto with annular flanges extending toward each other, twister mechanisms mounted on said disks extending from one disk to the other and secured to said annular flange, radially-extending arms secured to each disk between said twister mechanisms, a plate mounted on said arms between each pair of twister mechanisms, and means on said plates for holding the palings in place, the whole constituting a fence-forming drum, substantially as set forth.

16. In a wire-fence machine, a fence-forming revoluble drum having at intervals longitudinally-extending rows of twister-brackets, each formed of a pair of oppositely-located slotted plates, a longitudinally-movable rack-bar mounted in each longitudinal row of twister-brackets, a slotted and toothed twister-wheel mounted in each bracket in mesh with said rack-bar, and means for actuating said rack-bars.

17. In a wire-fence machine, a fence-forming revoluble drum having at intervals longitudinally-movable rack-bars, slotted twister-wheels mounted in mesh with said rack-bars, and means for actuating said rack-bars in succession as the drum is revolved.

18. In a wire-fence machine, a fence-forming drum having at intervals longitudinally-movable rack-bars, slotted twister-wheels mounted in mesh with said rack-bars, means for intermittently giving said drum movement, and means for actuating said rack-bars successively as the drum revolves.

19. In a wire-fence machine, a fence-forming drum, twister mechanisms mounted thereon located at intervals about the drum, means for intermittently giving said drum movement, and means for actuating said twister mechanisms during the stoppages of the drum.

20. In a wire-fence machine, a fence-forming drum having at intervals longitudinally-movable rack-bars, slotted twister-wheels mounted in mesh with said rack-bars, and a single means for both revolving the drum and actuating the rack-bars.

21. In a wire-fence machine, a fence-forming drum having at intervals longitudinally-movable rack-bars, slotted twister-wheels mounted in mesh with said rack-bars, and a single means for actuating said rack-bars and returning the same successively as the drum is revolved.

22. In a wire-fence machine, a fence-forming drum having at intervals longitudinally-movable rack-bars, slotted twister-wheels mounted in mesh with said rack-bars, means for intermittently giving said drum movement, means for actuating the rack-bars successively when on one side of the drum as the drum is revolved, and means for returning the rack-bars at the opposite side of the drum.

23. In a wire-fence machine, a fence-forming drum having at intervals longitudinally-movable rack-bars, slotted twister-wheels mounted in mesh with said rack-bars, a shaft for revolving said drum, a cam secured on said shaft, a lever actuated by said cam, a spring for returning said lever after being actuated, and means actuated by the lever for operating said rack-bars successively as the drum is revolved.

24. In a wire-fence machine, a fence-forming drum having at intervals longitudinally-movable rack-bars, slotted twister-wheels mounted in mesh with said rack-bars, a shaft for revolving said drum, a cam on said shaft, a lever actuated by said cam, a spring for returning said lever after being actuated, means pivotally connected with one end of said lever for actuating the rack-bars in succession as the drum is revolved, and means actuated by the other end of said lever for returning the rack-bars after being operated.

25. In a wire-fence machine, a fence-forming drum having at intervals longitudinally-movable rack-bars, slotted twister-wheels mounted in mesh with said rack-bars, a star-wheel, gearing actuated by the star-wheel for revolving the drum, a shaft, an arm on said shaft for engaging at each revolution one of the cranks on the star-wheel, a cam on said shaft with the beginning-point opposite the rear edge of said arm as the latter revolves, a lever actuated by said cam, and means actuated by said lever for operating the rack-bar successively as the drum is revolved.

26. In a wire-fence machine, a fence-forming drum having at intervals longitudinally-movable rack-bars, slotted twister-wheels mounted in mesh with said rack-bars, means for actuating said rack-bars successively as the drum is revolved, and means for limiting the actuating movement of said rack-bars.

27. In a wire-fence machine, a fence-forming drum having at intervals longitudinally-movable rack-bars, slotted twister-wheels mounted in mesh with said rack-bars, means for actuating said rack-bars successively as the drum is revolved, and an arm secured to the framework of the machine that limits the actuating movement of said rack-bars which arm is curved toward the drum for slightly returning said rack-bars so as to put the twister-wheels in position to release the fabric.

28. In a wire-fence machine, a fence-forming drum having at intervals longitudinally-movable rack-bars, slotted twister-wheels mounted in mesh with said rack-bars, means for intermittently giving said drum movement, means for actuating said rack-bars successively as the drum revolves, and means for alining said rack-bars so that the twister-wheels will be in position to receive the running-wires of the fence fabric.

29. In a wire-fence machine, a fence-forming drum having at intervals longitudinally-movable rack-bars, slotted twister-wheels mounted in mesh with said rack-bars, means for intermittently giving said drum movement, a guideway mounted over the drum and parallel therewith, a pawl slidably mounted in said guideway for engaging and actuating the rack-bars successively as the drum revolves, and means actuated by the drum-driving mechanism for operating said sliding pawl.

30. In a wire-fence machine, a revoluble fence-forming drum, suitable twister mechanism mounted thereon, a reel for drawing the running-wires over said drum, means below the horizontal plane through the axis of the drum for guiding one running-wire of each strand so that it feeds upward over the drum, and means immediately over the drum under which the running-wires coming down from above pass to the drum.

31. In a wire-fence machine, a revoluble fence-forming drum, suitable twisting mechanism mounted thereon, a reel for drawing the running-wires over said drum, means below the horizontal plane through the axis of the drum for guiding one running-wire of each strand so that it feeds upward over the drum, and means above the drum for guiding the remaining running-wires so that the palings may be placed in upon the running-wires passing up from below and in advance of the running-wires that are fed down from above.

32. In a wire-fence machine, a revoluble fence-forming drum, twister mechanism mounted thereon, a reel for drawing the running-wires of the fence fabric about and away from said drum, and a single means for revolving both the drum and the reel.

33. In a wire-fence machine, a reel formed of two parallel bars, spindles suitably mounted in the machine opposite each other, slotted frames in which the ends of said bars loosely fit, and detachable means for holding said bars in said frame.

34. In a wire-fence machine, means for forming a fabric consisting of running-wires and palings transversely interwoven at intervals, a reel for conveying said fabric through the machine, a roll over which said fabric is conveyed, hammers adapted to engage the fabric as it passes over said roll and more firmly unite the joints therein, and a single means for controlling the movement of the reel and the operation of the hammers so that the hammers will engage the fabric at the right places.

35. In a wire-fence machine, a revoluble drum with means for forming the fabric consisting of running-wires and palings transversely interwoven at intervals, a reel for receiving the fabric from the drum, a roll between the drum and the reel over which said fabric passes, a shaft mounted in proximity to the roll, and hammers secured to said shaft that when tripped engage the fabric on the roll, and a single means for driving the drum and tripping said hammers.

In witness whereof I have hereunto affixed my signature in the presence of the witnesses herein named.

JOHN W. DWIGGINS.

Witnesses:
  V. H. LOCKWOOD,
  N. ALLEMONG.